United States Patent [19]

Hodnett, III

[11] Patent Number: 4,557,980
[45] Date of Patent: Dec. 10, 1985

[54] RADIATION CURABLE COATING FOR FILM STRUCTURE

[75] Inventor: William P. Hodnett, III, Martinsville, Va.

[73] Assignee: Martin Processing, Inc., Martinville, Va.

[21] Appl. No.: 642,795

[22] Filed: Aug. 21, 1984

[51] Int. Cl.$^4$ .................. B32B 15/04; B32B 15/08; B05D 3/06

[52] U.S. Cl. .................. 428/336; 204/159.12; 427/54.1; 428/334; 428/457; 428/458; 428/463

[58] Field of Search ............... 428/336, 334, 457, 458, 428/463; 427/54.1; 204/159.12

[56] References Cited

U.S. PATENT DOCUMENTS

4,226,910  10/1980  Dahlen et al. .................. 428/336
4,308,119  12/1981  Rissell .................. 204/159.12
4,319,811  3/1982  Tu et al. .................. 427/54.1 X

Primary Examiner—Thomas J. Herbert
Attorney, Agent, or Firm—Stevens, Davis, Miller & Mosher

[57] ABSTRACT

The present invention relates to a unique radiation curable coating formulation used in the manufacture of window films. The coating composition is a mixture of radiation polymerizable monomers. The mixture includes a triacrylate or a tetraacrylate and acrylic acid. The thickness of the coating after polymerization ranges between about 1 and 2.5 microns. The coating can be applied to metal substrates and is used to achieve a superior abrasion resistant coating having optimum infrared absorption, while using high infrared absorption components in the coating mixture. Typically, the coating is applied to metal, for example, to aluminum substrates used in the fabrication of insulating window film or window structures. A process for applying the coating to such substrates is also disclosed.

29 Claims, 6 Drawing Figures

FIG. 3

RADIATION CURABLE COATING FOR FILM STRUCTURE

TECHNICAL FIELD

The present invention relates to a radiation curable coating for use in insulating window film and window structures.

BACKGROUND ART

Abrasion resistant coatings on a substrate are known in the art. These coatings are typically scratch resistant and resistant to attack by chemical and organic solvents. Typically, the coatings are curable either thermally or by radiation.

Thermal curing systems require removal of solvents and require provision of heat to process the coating. These requirements increase cost for energy consumption and protection of the environment. Of course, use of thermal curing systems on heat sensitive materials is precluded by the very nature of the process. Continuous processing using thermal curing systems is difficult because such systems are not readily adaptable to rapid continuous processing. Simply, thermally curing systems require heat and residence time in curing ovens to effect polymerization of an abrasion resistant coating.

It has been discovered that radiation curing systems overcome the disadvantages of thermal curing systems. Radiation curing systems have the advantage of reducing energy costs and environmental problems, reducing processing temperatures and processing times compared with thermal curing systems.

Thick coatings that are radiation curable are known in the art. It is known that a first monomer selected from the group consisting of triacrylates and tetraacrylates has been mixed with a second monomer having a N-vinyl imido group and then subjected to radiation curing. These coatings have been applied to various substrates. Typical coating thicknesses have been 1 to 25 microns. Thicker coatings have been necessary to obtain maximum abrasion resistance. These generally thick coatings have precluded certain uses for the coating.

U.S. Pat. No. 4,308,119 also relates to a radiation curable coating composition applicable to a variety of substrates. The coating composition comprises a pentaerythritol polyacrylate or polymethacrylate, such as pentaerythritol tetraacrylate, cellulose ester and a photoinitiator. Thick coatings are obtained by using the teachings of this patent even with spraying a coating thickness on the order of 0.1 to 1.5 mils.

An historic technique utilizes a composite energy control sheet. The sheet includes a semi-transparent reflective metal layer which is coated on a self-supporting polymeric foil and protectively covered with a transparent polymeric layer. Suitable polymers for the polymeric layer are polyethylene, polypropylene and polyacrylonitrile. However, polymers having low infrared radiation transmission properties and high infrared radiation absorption properties are disadvantageous. The thickness of the layer is preferably about 10 microns for adequate abrasion resistance. When the protective layer is applied by coating from a solvent, 5 to 15 microns is a fairly typical thickness, but thicknesses as great as 25 to 50 microns can be employed. Thicknesses less than 10 microns result in substantially reduced abrasion resistance.

The present invention discloses a superior coating formulation, method of application and product thereof which overcomes the disadvantages of the prior art and which has optimum abrasion resistance and minimal infrared absorption thereby achieving a superior insulating film or structure for use, for example, in windows.

SUMMARY OF THE INVENTION

The present invention relates to radiation curable coating for film structure. This structure can be for a conventional window. The coating comprises a mixture of radiation polymerizable monomers. The monomers include a triacrylate or tetraacrylate monomer and acrylic acid. The thickness of the coating after polymerization ranges between about 1 and about 2.5 microns. The addition of acrylic acid and the particular thickness of the coating are critical features of the subject invention. This criticality results in a coating that has optimum abrasion resistance and has minimal infrared absorption to provide an insulating film structure. A process for applying the thin coating of the present invention is also disclosed.

DISCLOSURE OF INVENTION

According to the present invention, a radiation curable coating for a film structure comprising a coating composition of a mixture of radiation polymerizable monomers comprising a triacrylate or tetraacrylate monomer and acrylic acid coating adhered to a metal surface having a thickness after polymerization between about 1 and about 2.5 microns is disclosed. This radiation curable coating results in an abrasion resisting coating having a substantially reduced infrared absorption and substantially improved weathering characteristics relative to the dimensions of the coating.

A process is also taught for applying the formulation to a substrate such as a metal, for example, aluminum. The method for fabricating the film structure of the present invention comprises preparing a coating composition of a mixture of radiation polymerizable monomers of a triacrylate or tetraacrylate monomer and acrylic acid, applying the mixture to a substrate, coating the substrate to a thickness after polymerization between about 1 and about 2.5 microns and polymerizing the coating to obtain a film structure. Overall, the radiation curable coating and method for its application overcome the disadvantages of the prior art noted above. Other process parameters of the present invention are conventional and well known to those skilled in the art.

BRIEF DESCRIPTION OF THE DRAWINGS

Features of the present invention will be described in connection with the accompanying drawings which schematically depict the film structure of the present invention. The features described in the drawings are illustrative and are not considered to limit the present invention. The drawing contains six figures.

The figures represent a relative comparison between known coating films used as window films and the last figure uses the teachings of the present invention. The figures are drawn to scale: one-quarter inch equals $2.5\mu$. The metalized layer is not drawn to scale.

Figure 1:
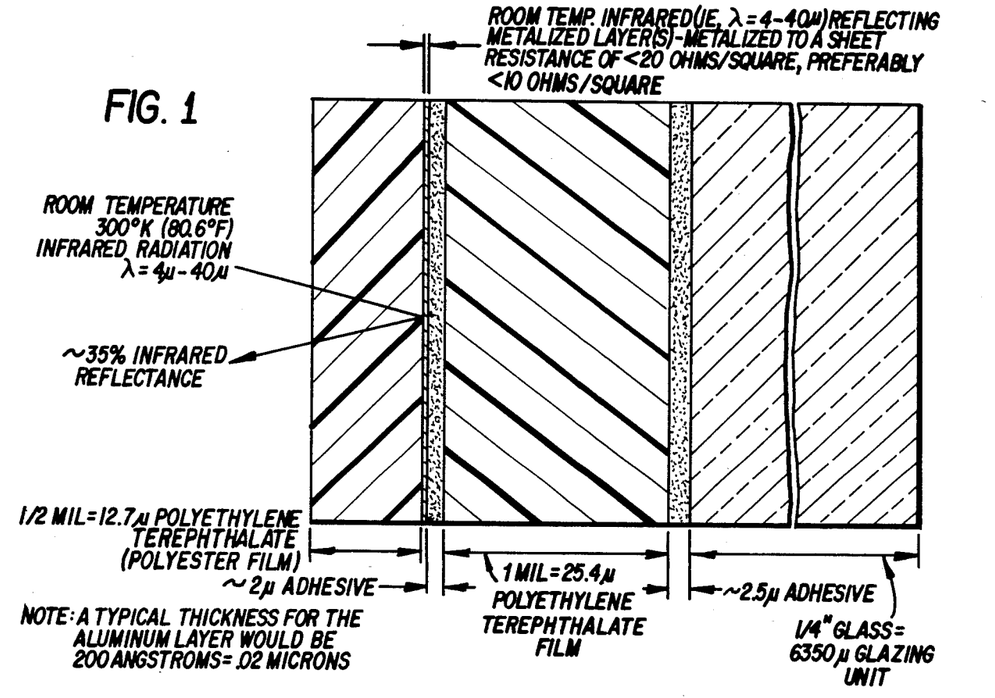
FIG. 1 shows a conventional window film.
Figure 2:
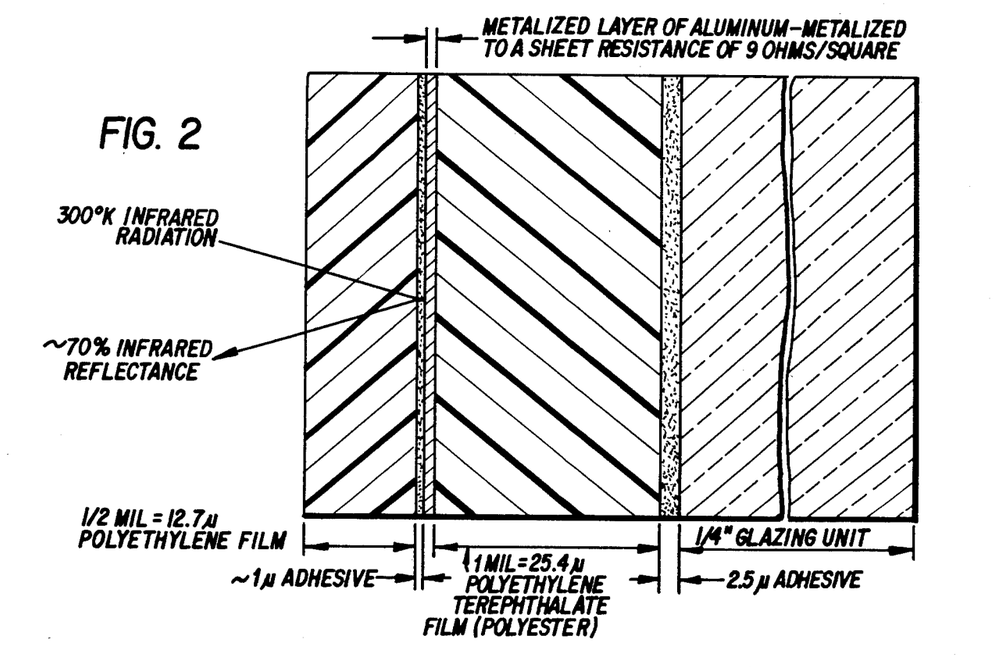
FIG. 2 shows the historic window film employed in the prior art.
Figure 3:
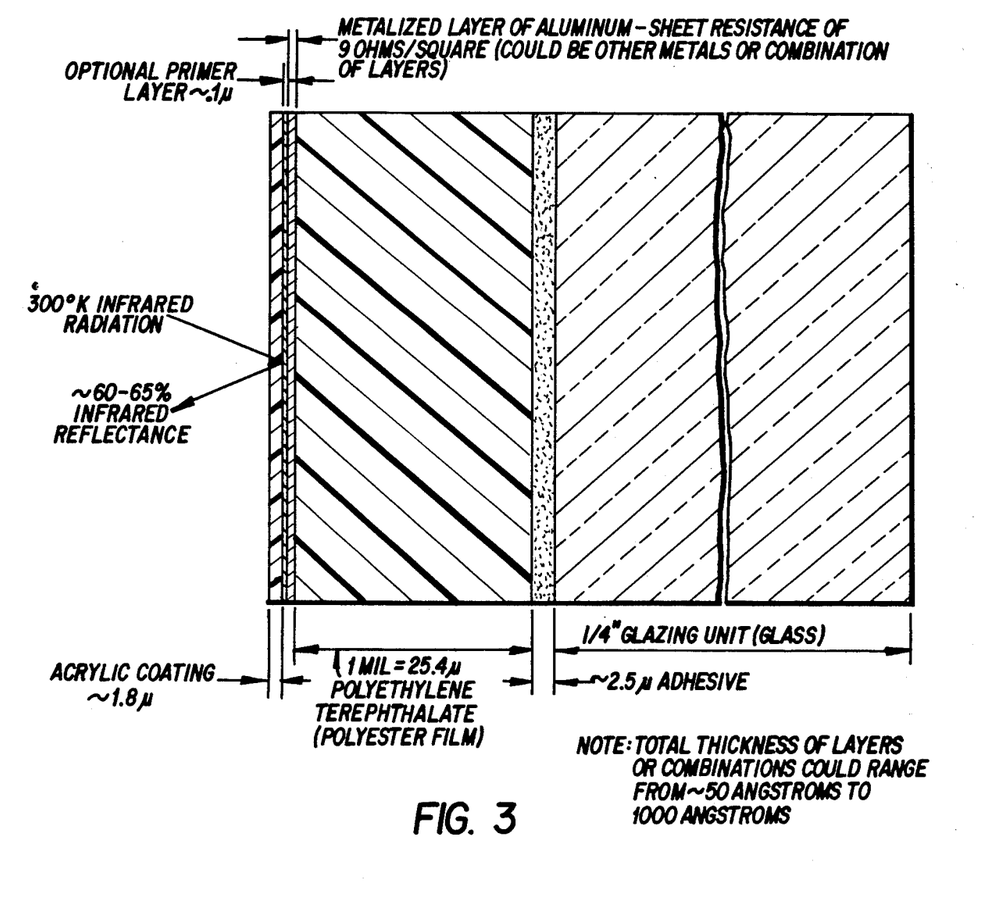
FIG. 3 shows the novel film structure of the present invention.

A conventional structure is shown in FIG. 1. This structure shows a conventional polyester coating having a thickness of one-half mil adhered to a reflective layer. When subjected to infrared radiation at room temperature, approximately 30% of room temperature infrared radiation is reflected. FIG. 2 shows a prior art structure using polyethylene, polypropylene or polyacrylonitrile coatings having a thickness of 5 to 50 microns, typically one-half mil polypropylene, whose abrasion resistance is substantially less than that of the coatings of the present invention. FIG. 3 shows an acrylic coating system using the teachings of the present invention (hereinafter, acrylic system or coating), having a thickness between about 1 and about 2.5 microns, with superior abrasion resistance compared to the structures shown in other figures. Approximately 60–65% infrared radiation is reflected.

These figures show the superior result obtained by the present invention. According to known coatings, insulating and abrasion resistant properties are obtained using thick coatings of low infrared absorption coating materials. Contrary to known coatings, this invention uses thin coatings with high infrared absorption materials to achieve optimum abrasion resistance and superior insulating properties.

THE BEST MODE FOR CARRYING OUT THE INVENTION

As previously mentioned, the radiation curable coating formulation of the present invention has advantages over the prior art. The coating of the present invention, which can be used for protecting a metal layer, is approximately four times more abrasion resistant than polyester coatings, which, in turn, are considerably more abrasion resistant than polyethylene, polypropylene or polyacrylonitrile coatings taught in the prior art. The coating is an acrylic coating and more resistant to degradation from ultra-violet light than known coatings. Optical clarity of the coating of the present invention is superior compared to polyethylene coatings of the prior art which are somewhat milky in color.

Because the coating formulation of the present invention is a radiation cured system, thin-coatings of the acrylic formulation permit an extremely high degree of cross-linking, thereby accounting for the high degree of scratch resistance achieved by the very thin coatings disclosed. Moreover, compared to prior art formulations involving polyethylene, polypropylene or polyacrylonitrile, the acrylic system of the present invention is highly absorbing with respect to infrared radiation at room temperature, but by carefully controlling coating thickness, between about 1 and about 2.5 microns after polymerization, superior abrasion resistance and low infrared absorption can be achieved through use of the disclosed inventive system. Optimum thickness has been discovered to be about 1.8 microns.

Thermally cured coatings, whether acrylic or otherwise, do not achieve the high degree of cross-linking and abrasion resistance achieved by the present inventive coating formulation without excessively long cure times at high tempertures. These undesirable requirements for thermally cured systems are disadvantageous for continuous processing. Radiation cured epoxy and urethane systems are not as absorbing as the systems of the present invention, but such systems are significantly less abrasion resistant.

The abrasion resistant and optimum infrared absorption coating of the present invention, using components having high infrared absorption characteristics, is obtained by copolymerizing a triacrylate or a tetraacrylate monomer with acrylic acid.

The acrylate is preferably pentaerythritol triacrylate or pentaerythritol tetraacrylate. Detailed disclosure concerning the acrylate is found in U.S. Pat. No. 4,319,811, which is hereby incorporated by reference. The conventional manner for mixing these monomers is set forth in that reference.

Acrylic acid is a critical component of the coating system that permits the thin coatings achieved by the teachings of the present invention to obtain coating systems having high optical clarity, superior adhesion properties and desirable rheological characteristics compared to known coating systems.

The preparation of the coating system is conventional. No chemical reaction is involved in mixing the system. The concentration of the tri- or tetraacrylate is at least about 50%. The concentration of acrylic acid is at least about 10%. All concentrations are by weight of the mixture.

The coatings of the present invention have both superior adhesion and chemical resistance. In particular, the coatings of the present invention have superior adhesion properties to metal substrates, compared to known coatings. Other desirable properties also result from the thin coating system, including enhanced stability to degradation of properties by ultra-violet radiation. Superior optical clarity, as well as superior abrasion resistance, are achieved even in view of the addition of acrylic acid to the system. Acrylic acid reduces abrasion resistance while complementing the adhesion properties of such coatings in a known manner. Clearly, addition of acrylic acid to the formulation is a critical feature, which permits manufacture of thin coatings while maintaining superior adhesion and abrasion resistance of the formulation.

Another critical feature of the present invention is the thickness of the coating applied to the substrate. The thickness of the coating after polymerization is between about 1 and about 2.5 microns, which is a substantial decrease in thickness over known coatings having superior abrasion resistance. The preferred coating thickness after polymerization is about 1.8 microns. The thickness is critical because increasing the thickness of the coating substantially increases the room temperature infrared absorption of an already high infrared absorption material. The prior art recognizes the opposite, relying upon thicker coatings to achieve abrasion resistance and structural integrity.

Of course, the system can be supplemented by addition of conventional ingredients, including known photoinitiators. Additives known in the art, such as pigments, wetting agents and dyes or color pigments, can be included in the formulation to achieve certain desirable functional and esthetic properties. The coating composition can also contain a surfactant as well as flow control and levelling agents, organic and inorganic dyestuffs and pigments, fillers, plasticizers, lubricants, ultraviolet absorbers, stabilizers and reinforcing agents, such as alumina, silica, clay, talc, powdered glass, powdered metals carbon black and fiberglass. The coating composition may also contain a polymerization inhibitor.

The protective coating formulation of the present invention can be applied to a variety of substrates, including metal, metal oxides, metal nitrides and other metal compounds and alloys which may be vacuum metalized, such as aluminum, steel, copper, tin, silver, gold, titanium oxide, tin oxide, indium oxide, titanium nitride, indium and multiple layers of them. Other substrates include glass, fiberglass and glass fiber optics. Plastic substrates, such as polyester, polycarbonate and polyvinyl chloride, are useful substrates which can be coated according to the invention. Any substrate which can be vacuum metalized is a suitable substrate. The substrate may include a combination of the preceding substrates. Thus, the substrate can comprise one or more layers of substrate materials, for example, a silver substrate between metal oxide substrates. Total thickness of layers or combinations of layers could range from approximately 50 Angstroms to 1000 Angstroms for metal layers or combinations of metal and metal compounds.

Coating can be achieved by conventional techniques, including dipping, spinning, spraying, curtain coating, gravure and roll coating. Preferably, the coating is achieved by using conventional gravure or roll coating techniques which permit the superior thin coatings of the present invention.

Conventional radiation curing techniques are employed in the present invention. Those techniques include either ultraviolet or electron beam, free radical induced polymerization types of radiation curing.

The process of the present invention involves the following steps. One step includes preparation of a coating composition comprising a mixture of the radiation polymerizable monomers mentioned above, including the addition of acrylic acid. The next step involves applying the mixture to a substrate using the methods already mentioned. The method also includes the critical step of coating the substrate to the thickness after polymerization between about 1 and about 2.5 microns. Then, this coating is polymerized to obtain a film structure. The substrate may be a metal or non-metal substrate. The film structure is employed as a conventional window product.

Typically, the triacrylate or tetraacrylate monomer is added to an acrylic acid monomer in the concentrations mentioned above. This coating mixture is applied to a substrate, which may be a metal or non-metal substrate, using, for example, a conventional direct gravure coating method. This method utilizes an engraved cylinder which rotates in a coating bath in a continuous manner. Excess coating is "doctored" from the surface of the metering cylinder using conventional or reverse angle doctoring techniques. Then the doctored cylinder is continuously mated with the substrate, whereby the coating mixture in cells of the engraved cylinder is continuously transferred to the substrate being coated. The coating is then radiation polymerized on the substrate in a known manner. Of course, processing typically takes place continuously, but may be batchwise.

A primed layer may be included between the coating and the substrate. The primed layer can be composed of, for example, a polyester resin which has high infrared absorption. The purpose of the primed layer is principally to promote adherence of the coating to the substrate.

EXAMPLES

The following Examples illustrate the formulation, method of application and a product of the present invention. Although manufacture of window films is described below, that manufacture is merely illustrative of the preferred product and is not considered to limit the present invention.

EXAMPLE 1

This Example shows emittance versus coating thickness relationships for three types of protective coatings. By definition, the sum of the (infrared reflectance) and the (emittance) of an infrared reflecting surface or system $= 1$. The infrared being considered (4 to 40 micron wavelength) is reflected from a metal layer protected with an infrared transmitting layer. The total emittance of a system (metal and protective coating) can be thought of as the combined absorbtion of the metal layer and the protective layer. The smaller the total emittance value, the more efficient the system with respect to infrared reflectance. The greater the infrared reflectance value, the more efficient the system with respect to reduction of heat loss, because infrared not reflected back into the room is absorbed by the remainder of the window unit and transferred to the cooler outside air. The following relationship summarizes these thoughts:

$$\% \text{ Infrared Reflectance of a System} = [1 - (\text{Total Emittance of System})] \times 100$$

The data shows that the acrylic coating is the most absorbing (thickness for thickness) of the three coatings shown. However, the acrylic system according to the present invention compensates for this deficiency by having superior abrasion resistance, and at 1.8 microns thickness, still maintains an infrared reflectance advantage (62% versus 35%) over "conventional" window film structures, wherein the protective layer is 0.5 mils of polyethylene terephthalate film.

The acrylic coating of Example 1 was prepared by combining 70 parts of pentaerythritol tetraacrylate with 25 parts of acrylic acid. The pentaerythritol tetraacrylate must be warmed to approximately 100° F. because the monomer is usually a solid at room temperature. After the pentaerythritol tetraacrylate is completely liquefied, the acrylic acid is added and mixed thoroughly to a homogeneous mixture. Photoinitiator (1-hydroxycyclohexyl pehnyl ketone) is added and mixing is continued until the photoinitiator is completely dissolved. (Photoinitiators would not be added to a system that would be polymerized by an electron beam.) The photoinitiator is present at 3 to 8 parts by weight. Mixing is continued until ingredients are thoroughly dissolved in the coating mixture. The coating mixture is filtered and applied to the metal side of polyethylene terephthalate vacuum metalized film by direct gravure and polymerized by ultraviolet radiation to obtain the acrylic coating of Example 1.

The results are reported in the following Table and FIG. 4.

TABLE I

Total Combined Emittance Values
For Three Protective Coatings (All Protective
Coatings Applied To Metallized Layer of Emittence = .14)

| Type of Protective Coating | Thickness of Protecting Coating (Microns) | Total Emittance |
|---|---|---|
| 1. Polypropylene Laminate | 12.7 | .35 |
| 2. Polyester Laminate (Polyethylene Terephthalate) | 12.7 | .65 |
| 3. Acrylic Coating (Radiation Cured) | 0.9 | .25 |
| | 1.0 | .28 |
| | 1.2 | .32 |
| | 1.3 | .34 |
| | 1.5 | .35 |
| | 1.8 | .38 |
| | 2.0 | .40 |
| | 2.7 | .44 |
| | 3.8 | .50 |
| | 4.0 | .51 |
| | 4.3 | .53 |
| | 4.7 | .54 |

The acrylic coating of Example 1 has been successfully applied to various vacuum metalized surfaces, including metals, metal alloys and metallic oxides. Metals include: aluminum, copper, titanium, silver, steel alloy and chrome alloy. Metal oxides include: titanium oxide, indium oxide, indium alloy oxide and tin oxide. The vacuum metallized film in Example 1 is metallized to visible light transmission of 18–20%. This results in a metal surface with a total emittance of approximately 0.14.

EXAMPLE 2

Figure 5:
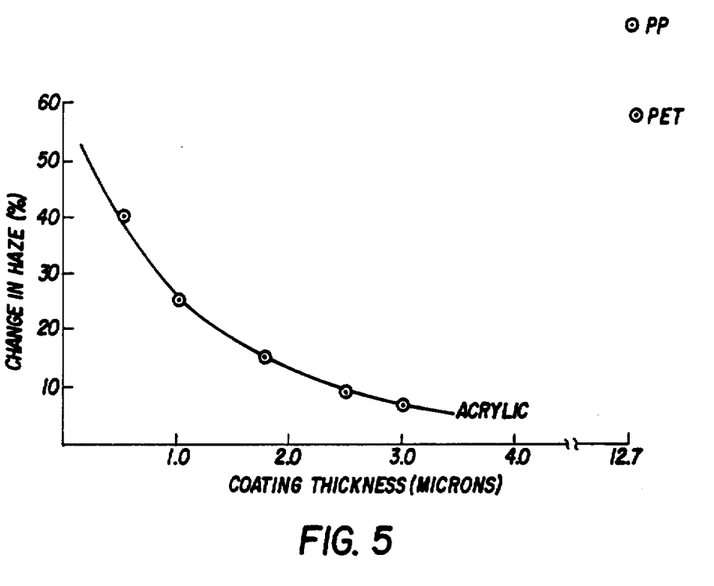
FIG. 5 shows a graph for average change in haze values.

This Example shows (change in haze values) versus different (coating thickness values) for the acrylic coating of Example 1. The acrylic protective coatings were applied to 2 mil polyethylene terephthalate film. Change in haze values for the coating thicknesses being considered can be measured more reliably when the coating is evaluated on non-metallized films. The sample acrylic coatings were abraded on a Tabor abrader, described in ASTM D 1004-56 (CS-10 wheels, 1000 grams load per wheel, 100 cycles). Haze measurements were made using a conventional Hunter haze measurement device. Thickness measurements were made using a conventional stylus thin film measuring device. The following Table and FIG. 5 show the results.

TABLE II

Average Change in Haze Values for 2 mil (.002 inch)
Polyethylene Terephthalate Film With Coating of Example 1

| Coating Thickness (Microns) | Change in Haze Value (%) |
|---|---|
| 0.0 (Uncoated 12.7$\mu$ Polypropylene) | 77 |
| 0.0 (Uncoated 12.7$\mu$ Polyethylene · Terepathalate) | 58 |
| 0.5 (Acrylic) | 40 |
| 1.0 (Acrylic) | 25 |
| 1.8 (Acrylic) | 15 |
| 2.5 (Acrylic) | 8 |
| 3.0 (Acrylic) | 7 |

The data show that 1.8 microns is the optimum thickness for coatings of the present invention for several reasons:

1. 1.8 microns is the optimum thickness, as shown by the results of Example 1;

2. The slope of the curve (FIG. 5) shows that for thicknesses less than 1.8 microns there is a rapidly increasing rate of change in haze values;

3. UVCON environmental testing in Example 5, infra, shows that a 1 micron coating is the minimum thickness that provides adequate metal protection;

4. 0000 steel wool testing in Example 4, infra, shows that a thickness of 1 micron is the minimum thickness to provide a significant abrasion resistance advantage over polyethylene terephthalate film, a metal protective layer used in "conventional" window film structures;

5. Thin coatings, with a refractive index close to 1.5, will exhibit interference colors at a thickness less than 1 micron when coated on a metallized surface. This effect is similar to that of a thin film of oil floating on water. Slight differences in coating thickness can produce colors which are esthetically unacceptable in a window film product; and 6. Coatings of thickness greater than 2.5 microns do not significantly reduce the change in haze values. Also, thicker coatings are more expensive and produce "curl" of the window film product, which cause handling difficulties for film installers.

EXAMPLE 3

This Example shows the difference between two formulations of the acrylic coating of Example 1 with respect to adhesion of the coating to the aluminum layer of metalized 2 mil polyethylene terephthalate film. The results are shown in the following Table:

TABLE III

| Coating | X-Hatch-Tape Test | Rolling Adhesion Test |
|---|---|---|
| Acrylic (~20% Acrylic Acid) | Pass | Pass |
| Acrylic (~20% N—vinylpyrrolidone) | Fail | Fail |

The tests used to evaluate adhesion are described as follows:

X-Hatch-Tape Test

In this test, an "X" is scribed into the coating with the point of a razor knife. SCOTCH Brand 810 tape is applied to the coating over the cross-hatch. The tape is removed by hand with a quick motion in the plane of the coating. Removal of more than trace quantities of the coating constitutes failure of the test.

Rolling Adhesion Test

In this test, the coated sample is placed between the thumb and forefinger and folded 180° on itself (coated side of sample adjacent to fingers). In this position, the coated sample is rolled back and forth between the fingers (moderate to heavy finger pressure) for 10 cycles, while maintaining the 180° bend. Any visible flaking of the coating or loss of adhesion to the metal constitutes failure of the test.

EXAMPLE 4

This Example shows the differences between the three systems of Example 1 with respect to 0000 steel wool scratch resistance. In this test, a 0000 steel wool pad is rubbed (with just sufficient pressure to scratch both surfaces) across the interface of a folded sample. In this way, the steel wool scratch resistance of both surfaces can be directly compared. The surface with the greater scratch resistance will have the least number of scratches. The results of applying this test to the three systems of Example 1 are reported in the following Table:

TABLE IV

| Surface-1 | Surface-2 | Result |
|---|---|---|
| Polypropylene | Polyester | Polypropylene shows severe scratching |
| Polyester | Polyester | Both surfaces show equal number of scratches |
| Acrylic (Example 1) | Polyester | Acrylic surface showed fewer number of scratches |

Figure 6:
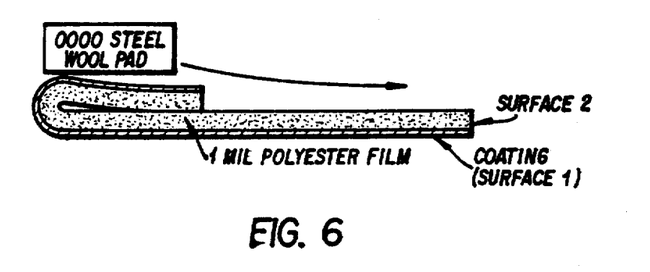
FIG. 6 shows a drawing explaining the legends in Table IV.

The legends in Table IV are explained in FIG. 6.

EXAMPLE 5

This Example shows the resistance to simulated outdoor exposure of a metal protecting acrylic layer compared to a polypropylene protective layer. Both protective layers were exposed to alternating cycles of ultraviolet radiation and moisture condensation. The samples were exposed in an Atlas UVCON accelerated weathering test device for a period of 144 hours, where alternating 8 hours of ultraviolet exposure at 60° C. and 4 hours of moisture condensation at 40° C. are experienced by the test sample. Results are reported in the following Table:

TABLE V

| Description of Protective Layer | Result After 144 Hours Exposure |
|---|---|
| Acrylic Coating (Example 1) | No visible change |
| Polypropylene Protective Layer | Protective layer showed signs of cracking and delamination |

EXAMPLE 6

This Example shows the difference between the acrylic formulation without acrylic acid versus with 20% acrylic acid. Tabor testing was done on coatings applied to 1 mil (I.C.I. 442) polyethylene terephthalate film.

TABLE VI

| | Coating Thickness (Microns) | Haze (%) |
|---|---|---|
| Acrylic (with ~20% N—vinylpyrrolidone) | 1.0 | 15 |
| Acrylic (with ~20% acrylic acid) | 1.0 | 25 |
| Acrylic (with ~20% N—vinylpyrrolidone) | 1.8 | 6 |
| Acrylic (with ~20% acrylic acid) | 1.8 | 15 |

This Example shows that the addition of ~20% acrylic acid to the formulation reduces the abrasion resistance (i.e., increases the $\Delta$ haze values) for coatings of the same thickness.

It is not intended to limit the present invention to the specific embodiments described above. It is recognized that other changes may be made in the formulation and method of application specifically described herein without deviating from the scope and teachings of the present invention. It is intended to encompass all other embodiments, alternatives, and modifications consistent with the present invention.

What is claimed is:

1. A radiation curable coating for a film structure, comprising a coating composition of a mixture of radiation polymerizable monomers comprising a triacrylate or tetraacrylate monomer and acrylic acid, said coating adhered to a substrate, the thickness of said coating after polymerization ranging between about 1 and about 2.5 microns, whereby an abrasion resistant coating having substantially reduced infrared absorption is obtained.

2. The radiation curable coating according to claim 1, wherein the substrate is non-metallic.

3. The radiation curable coating according to claim 1, wherein the film structure is a window film.

4. The radiation curable coating according to claim 1, wherein the thickness of the coating after polymerization is about 1.8 microns.

5. The radiation curable coating according to claim 1, wherein the tetraacrylate is pentaerythritol tetraacrylate.

6. The radiation curable coating according to claim 1, wherein the concentration of the triacrylate or tetraacrylate is at least about 50% by weight of the mixture.

7. The radiation curable coating according to claim 1, wherein the concentration of the acrylic acid is from about 10% to about 50% by weight of the mixture.

8. The radiation curable coating according to claim 1, wherein the substrate is a metal substrate.

9. The radiation curable coating of claim 8, wherein the metal substrate is aluminum.

10. The radiation curable coating according to claim 1, wherein the film structure includes a primed layer between the coating layer and the substrate.

11. The radiation curable coating according to claim 10, wherein the primed layer is a polyester resin.

12. The radiation curable coating according to claim 1, wherein the substrate includes more than one metal or metal compound layers.

13. The radiation curable coating of claim 12, wherein a silver substrate layer is between metal oxide layers.

14. A window film comprising a radiation curable coating composition of a mixture of radiation polymerizable monomers consisting essentially of pentaerythritol tetraacrylate having a concentration of at least about 50% by weight of the mixture, and acrylic acid having a concentration from about 10% to about 50% by weight of the mixture, a metal substrate adhered to the coating composition and to a window film, the thickness of the coating after polymerization ranging between about 1 and about 2.5 microns, whereby an abrasion resistant, low infrared absorption insulating window is obtained.

15. A radiation curable coating for a film structure, comprising a coating composition of a mixture of radiation polymerizable monomers comprising a triacrylate or tetraacrylate monomer and acrylic acid, said coating adhered to a substrate, the thickness of said coating after polymerization being at least about 1 micron, whereby an abrasion-resistant coating is obtained.

16. The radiation curable coating according to claim 15, wherein the substrate is a metal or metal compound.

17. The radiation curable coating according to claim 15 in which the concentration of acrylic acid is at least 10% by weight of mixture.

18. A process for fabricating a film structure, comprising the steps of preparing a coating composition of a mixture of radiation polymerizable monomers comprising a triacrylate or tetraacrylate monomer and acrylic acid; applying the mixture to a metal or metal compound substrate; coating the substrate to a thickness after polymerization between about 1 and about 2.5 microns; and radiation polymerizing the coating to obtain a film structure.

19. The process according to claim 18, further comprising radiation polymerization using electron beam free radical induced radiation.

20. The process according to claim 18, further comprising pentaerythritol tetraacrylate as the tetraacrylate.

21. The process according to claim 18, further comprising a concentration of triacrylate or tetraacrylate of at least about 50% by weight of the mixture.

22. The process according to claim 18, further comprising a concentration of acrylic acid from about 10% to about 50% by weight of the mixture.

23. The process according to claim 18, further comprising radiation polymerization using ultra-violet radiation.

24. The process according to claim 18, wherein the substrate is aluminum.

25. The process according to claim 18, further comprising coating the substrate to a thickness after polymerization of about 1.8 microns.

26. The process according to claim 18, further comprising applying a primed layer between the coating layer and the substrate.

27. The process according to claim 26, wherein the primed layer includes a polyester resin.

28. The process according to claim 18, wherein the substrate includes one or more metal or metal compound layers.

29. The process according to claim 28, wherein the substrate is a silver layer between metal oxide layers.

* * * * *

UNITED STATES PATENT AND TRADEMARK OFFICE
CERTIFICATE OF CORRECTION

PATENT NO. : 4,557,980

DATED : December 10, 1985

INVENTOR(S) : Hodnett, III

It is certified that error appears in the above-identified patent and that said Letters Patent is hereby corrected as shown below:

In the list of references cited, the name of the patentee for U.S. Patent No. 4,308,119 should be "Russell" not "Rissell".

Figure 4:
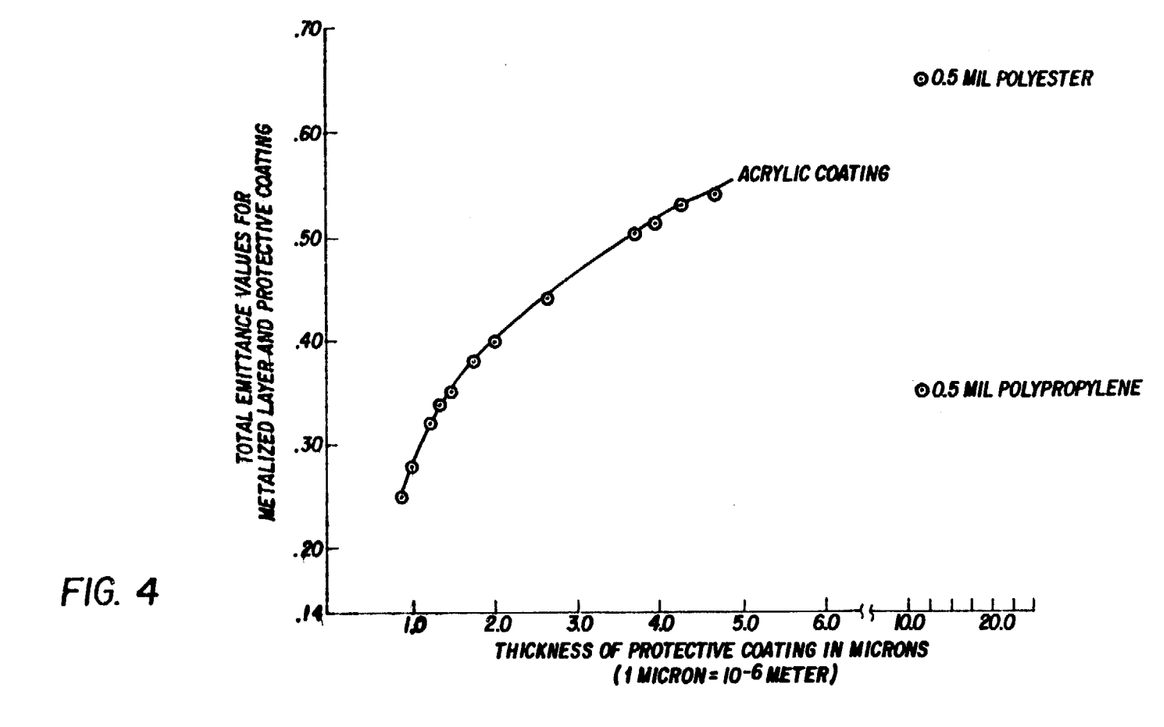
FIG. 4 shows a graph for total combined emittance values for three protective coatings.

In the drawings, figures 4-6 should appear as shown on the attached sheets.

Signed and Sealed this

Twenty-seventh Day of May 1986

[SEAL]

Attest:

DONALD J. QUIGG

Attesting Officer

Commissioner of Patents and Trademarks